United States Patent [19]

Dillman et al.

[11] 4,193,817

[45] Mar. 18, 1980

[54] PRODUCTION OF BOTTLER'S LIQUID SUGAR

[75] Inventors: Terry R. Dillman; Dennis J. Burke, both of Rockford, Ill.

[73] Assignee: Illinois Water Treatment, Rockford, Ill.

[21] Appl. No.: 22,586

[22] Filed: Mar. 22, 1979

[51] Int. Cl.[2] ........................ C13D 3/14; B10D 15/06; B01J 1/09

[52] U.S. Cl. .................................... 127/46 A; 127/30; 127/55; 210/30 R; 210/32

[58] Field of Search ................... 127/22, 30, 46 A, 55; 210/30 R, 32

[56] References Cited

U.S. PATENT DOCUMENTS

| | | | |
|---|---|---|---|
| 1,699,449 | 1/1929 | Ray . | |
| 2,151,883 | 3/1939 | Adams | 127/46 A |
| 2,507,992 | 5/1950 | Payne | 127/46 A |
| 2,578,938 | 12/1951 | Kunin | 127/46 A |
| 2,626,878 | 1/1953 | Bartz | 127/46 A |
| 2,753,279 | 7/1956 | Cushing | 127/46 A |
| 2,785,998 | 3/1957 | Harding | 127/46 A |
| 2,890,972 | 6/1959 | Wheaton | 127/46 A |
| 2,891,007 | 6/1959 | Caskey | 210/35 |
| 3,122,456 | 2/1964 | Meler | 127/46 A |
| 3,196,045 | 7/1965 | Mihara | 127/46 A |
| 3,314,818 | 4/1967 | Swarthout | 127/48 |
| 3,420,709 | 1/1969 | Barrett | 127/53 |
| 3,436,344 | 4/1969 | Canning | 210/39 |
| 3,462,299 | 8/1969 | Haberich | 127/55 X |
| 3,481,783 | 12/1969 | von der Linde | 127/30 X |
| 3,551,203 | 12/1970 | Corson | 127/46 R |
| 3,563,799 | 2/1971 | Zievers | 127/30 X |
| 3,584,617 | 6/1971 | Stachenko | 127/30 X |
| 3,591,415 | 7/1971 | Zievers | 127/14 |
| 3,618,589 | 11/1971 | Tavani | 127/46 A |
| 3,708,337 | 1/1973 | Smith | 127/46 R |
| 3,762,948 | 10/1973 | Morton | 127/46 A |
| 3,837,914 | 9/1974 | Cadeo | 127/22 |
| 3,966,489 | 6/1976 | Barrett | 127/46 A |
| 4,040,861 | 8/1977 | Walon | 127/46 A |
| 4,046,590 | 9/1977 | Riffer | 127/46 B |
| 4,082,564 | 4/1978 | Fries | 127/46 A |

OTHER PUBLICATIONS

G. Merrill Andrus, Sugar y Azugar, "Sugar Decolorization with Anion-Exchange Resins", May 1967.

F. X. McGarvey, "The Evaluation of Ion Exchange Resins for Sugar Liquor Decolorization", Paper presented to Meeting of Sugar Industry Technicians, New York, May 2-4, 1965.

"Duolite Ion Exchange Resins in Treatment of Sugar Solutions", ©1972, Diamond Shamrock, Corp., pp. 38-40.

Spencer-Meade "Cane Sugar Handbook", 9th Edition, Chapts. 18-20, John Wiley & Sons, Inc., New York, 1963.

Sugar Industry Abstracts, 25 (7), Abstract 647 (1963).

Sugar Industry Abstracts, 24 (3), Abstract 162 (1962).

"This is Liquid Sugar", Refined Syrups & Sugars, Inc. Yonkers, N.Y., 1955.

"Use of Sugars and Other Carbohydrates", pp. 35-42 and 70-74, Am. Chem. Soc., Washington, 1955.

*Primary Examiner*—Sidney Marantz

*Attorney, Agent, or Firm*—George R. Clark; Neil M. Rose; Allen J. Hoover

[57] ABSTRACT

Bottler's liquid sugar is produced essentially from brown sugar, which is derived from cane sugar and crystallized in one or more intermediate strikes, by remelting the crystallized product of one or more intermediate strikes, filtering the remelted product, and passing the filtered product in contact with chloride form of Type-1 strong-base anion-exchange resin. An array of plural columns, which contain similar resin, is operated in a merry-go-round sequence allowing continuous operation. Countercurrent regeneration is preferred. Regeneration by an aqueous solution of hydrochloric acid followed by an aqueous solution of sodium chloride and sodium hydroxide allows service at 30° C.

20 Claims, 9 Drawing Figures

PRODUCTION OF BOTTLER'S LIQUID SUGAR

BACKGROUND OF THE INVENTION

1. Field of the Invention

This invention pertains generally to a process for production of liquid sugar essentially from brown sugar derived from sugar cane. This invention pertains particularly to a process for production of liquid sugar suitable for use in bottled soft drinks and comparable in color to liquid sugar produced primarily from refined sugar.

2. Brief Description of the Prior Art

It is known to produce liquid sugar, of a type called bottler's liquid sugar herein to reflect its principal utility for use in bottled soft drinks, generally from cane sugar and particularly from a mixture containing a major portion of refined sugar, which has been crystallized from sugar liquor in early strikes, and a minor portion of brown sugar, which has been crystallized from sugar liquor in intermediate strikes. As bottler's liquid sugar may be produced in some countries, particularly where refined sugar is not available in sufficiently large quantities at sufficiently low cost to foster use of refined sugar in pure form, as much as about 10 to 14% by dry weight of brown sugar may be used. Despite its availability commonly in large quantities at low cost, greater amounts of brown sugar have been excluded from production of bottler's liquid sugar, so as to avoid unacceptable discoloration.

Various techniques for decolorization of sugar liquors and sugar syrups have been practiced, in production of refined sugar in refineries, conventionally before crystallization from sugar liquors. Such techniques have employed various carbonaceous materials, ionic-exchange resins, ionic-sorption resins, and various other materials. One technique of particular interest has employed chloride form of Type-1 strong-base anion-exchange resin.

The technique employing chloride form of Type-1 strong-base anion-exchange resin, as applied variously to sugar liquors and sugar syrups, is described in various publications including U.S. Pat. No. 2,785,998 to F. H. Harding et al.; G. Merrill Andrus, "Sugar Decolorization with Anion-Exchange Resins", Reprint from the May 1967 issue of *Sugar y Azugar;* F. X. McGarvey, "The Evaluation of Ion Exchange Resins for Sugar Liquor Decolorization", Paper presented to Meeting of Sugar Industry Technicians, New York, May 2-4, 1965; and *Duolite Ion Exchange Resins in the Treatment of Sugar Solutions,* © 1972 Diamond Shamrock Corporation, particularly at pages 38 through 40.

A detailed description of a typical sequence including decolorization in production of cane sugar by several sequential strikes from sugar liquors is found in Chapters 18 through 20 of Spencer-Meade, *Cane Sugar Handbook* (9th Edition, John Wiley & Sons, Inc., 1963). It is evident from Spencer-Meade, op. cit., and other sources that sugar refineries are major investments of vast capital, whereupon it is to be expected that increased demand for refined sugar, as for use in bottled soft drinks, cannot easily be accommodated from local refineries in some areas where expansion capital is not readily available for such refineries.

SUMMARY OF THE INVENTION

This invention provides a process for production of bottler's liquid sugar essentially from brown sugar derived from cane sugar and crystallized in one or more intermediate strikes from sugar liquors. Broadly, the process comprises the steps of remelting the crystallized product of one or more intermediate strikes, filtering the remelted product, and passing the filtered product in contact with chloride form of Type-1 strong-base anion-exchange resin.

The filtered product may be passed serially through at least two beds of similar resin. The beds may be interchanged in a merry-go-round sequence for purposes of regeneration. The resin may be regenerated by a regenerant (or a sequence of regenerants) preferably passed countercurrently with respect to the filtered product in service.

The regenerant may be an aqueous solution of either sodium chloride or hydrochloric acid and also may contain sodium hypochlorite in the aqueous solution. If sodium chloride is used in the aqueous solution, sodium hydroxide, potassium hydroxide, ammonium hydroxide, or a mixture of these hydroxides either may be used in the same solution or may be used in another aqueous solution passed before and concurrently with the aqueous solution of sodium chloride.

It has been discovered that, if the resin is regenerated by an aqueous solution of hydrochloric acid followed by an aqueous solution of sodium chloride wherein the aqueous solution of sodium chloride also contains sodium hydroxide, potassium hydroxide, ammonium hydroxide, or mixtures thereof, preferably sodium hydroxide, and wherein the aqueous solution of hydrochloric acid also may contain sodium hypochlorite, the product advantageously may be passed in contact with the resin at a temperature of about 30° C.

The process of this invention enables bottler's liquid sugar to be produced essentially from brown sugar derived from cane sugar and crystallized in intermediate strikes. The product of the process is comparable in color to bottler's liquid sugar produced primarily from refined sugar, particularly from a major portion (at least about 86 to 90% by dry weight) of refined sugar, which has been crystallized from sugar liquors in early strikes, and a minor portion (up to about 10 to 14% by dry weight) of brown sugar, which has been crystallized in intermediate strikes from sugar liquors.

The process of this invention enables bottler's liquid sugar advantageously and economically to be produced outside sugar refineries, as by a user of bottler's liquid sugar, and is expected to alleviate local shortages of refined sugar. It is contemplated by this invention that, as where refined sugar is plentiful from time to time but not always for production of bottler's liquid sugar, the product of this invention may be blended with refined sugar when partial shortages of refined sugar occur. Likewise, refined sugar may be blended in, at any stage of the process of this invention.

BRIEF DESCRIPTION OF THE DRAWINGS

In FIG. 1 and FIG. 2, common references are used to indicate common steps, as occur in sugar refineries processing cane sugar.

DETAILED DESCRIPTION OF THE PREFERRED EMBODIMENTS

Figure 1:
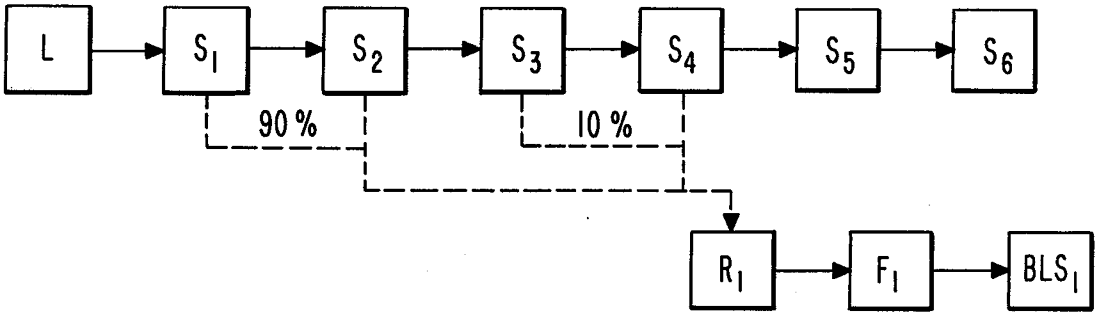
PRIOR ART FIG. 1
FIG. 1 is a time chart of certain steps in production of bottler's liquid sugar in accordance with prior art.
Figure 2:
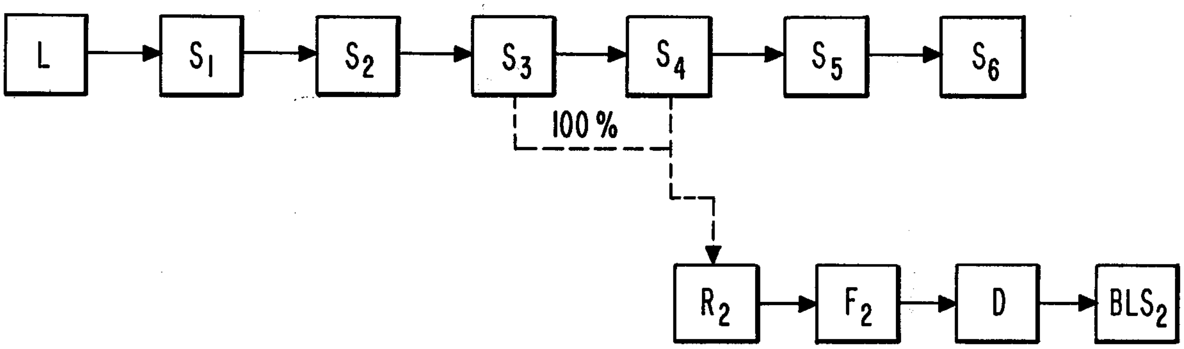
FIG. 2 is a time chart of certain steps in production of bottler's liquid sugar in accordance with this invention.

As indicated in FIG. 1 and FIG. 2, it is common practice in sugar refineries processing cane sugar to process sugar liquors, as indicated at L, by various steps, which may include steps of decolorization by various techniques mentioned above. Such techniques include contact with carbonaceous materials and contact with suitable resin, which may be chloride form of Type-1 strong-base anion-exchange resin. Further details of preparation of sugar liquors for crystallization in sugar refineries processing cane sugar may be found in Spencer-Meade, op. cit.

As also indicated in FIG. 1 and FIG. 2, sugar is crystallized from sugar liquors in a series of sequential steps known as strikes, as indicated at $S_1$ through $S_6$. Sugar crystallized in early strikes, as indicated at $S_1$ and $S_2$, is regarded as refined sugar. Sugar crystallized in intermediate strikes, as indicated at $S_3$ and $S_4$, is regarded as light, yellow, or brown sugar, herein as brown sugar. Sugar crystallized in late strikes, as indicated at $S_5$ and $S_6$, is regarded as residual sugar. Six is an exemplary number of strikes, as different numbers of early, intermediate, and late strikes are taken in different refineries. Further details of crystallization in sugar refineries processing cane sugar may be found in Spencer-Meade, op. cit.

FIG. 1 represents preparation of bottler's liquid sugar in accordance with prior art. A mixture containing a major portion (90% by dry weight as shown) of refined sugar crystallized in early strikes and a minor portion (10% by dry weight as shown) of brown sugar crystallized in intermediate strikes is remelted, as indicated at $R_1$, and filtered, as indicated at $F_1$, to yield bottler's liquid sugar, as indicated at $BLS_1$. A portion greater than about 10 to 14% by dry weight of brown sugar is not used for reasons explained above.

FIG. 2 represents preparation of bottler's liquid sugar in accordance with this invention. Brown sugar crystallized in intermediate strikes is remelted, as indicated at $R_2$, filtered, as indicated at $F_2$, and decolorized, as indicated at D, to yield bottler's liquid sugar, as indicated at $BLS_2$. No contribution of refined sugar is necessary. The remelting and filtering steps may be accomplished in accordance with prior practices as used in production of bottler's liquid sugar as represented in FIG. 1. Decolorization is accomplished by passing the filtered product in contact with chloride form of Type-1 strong-base anion-exchange resin, a detailed description of which is found in the aforementioned publications, particularly in U.S. Pat. No. 2,785,998 to F. H. Harding et al., in column 2, lines 28 et seq.

Figure 3A:
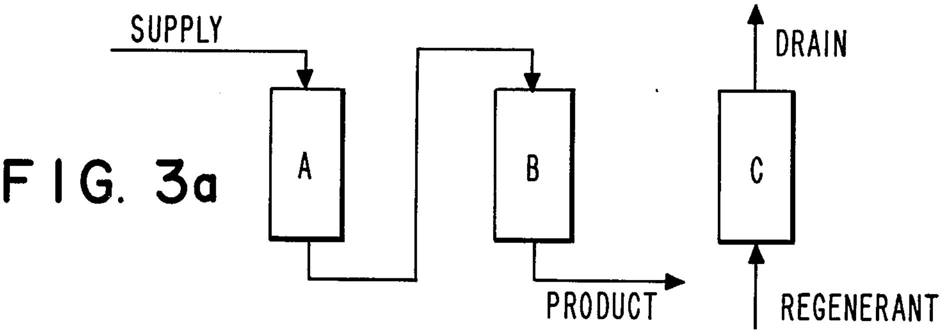
FIGS. 3*a* through 3*c* are sequential flow charts of service and regeneration in an array of three columns, in which the process of this invention preferably may be practiced, in a merry-go-round sequence for continuous operation. Countercurrent regeneration is shown.
Figure 3B:
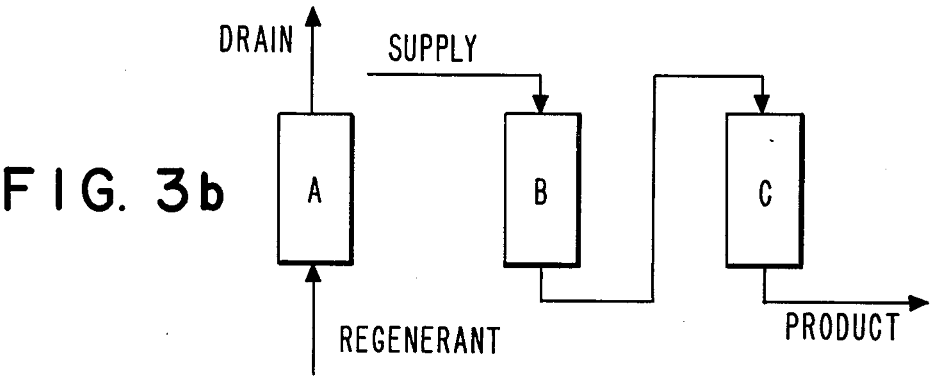
Figure 3C:
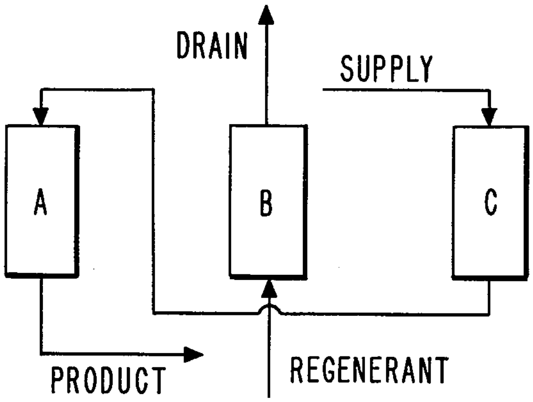

As shown in FIGS. 3*a* through 3*c*, a column A and a column B of conventional construction are filled to suitable levels with chloride form of Type-1 anion-exchange resin and interconnected in conventional manner, so as to be operable in a merry-go-round sequence as described below. Continuous operation is represented.

As shown in FIG. 3*a*, wherein the column A and the column B are in service and the column C is in regeneration, brown sugar derived from cane sugar and crystallized from sugar liquors in intermediate strikes is fed onto the resin in column A, withdrawn beneath the resin in column A, fed onto the resin in column B, and withdrawn beneath the resin in column B to yield bottler's liquid sugar. Meanwhile, the resin in the column C is regenerated, as described below.

As shown in FIG. 3*b*, wherein the column B and the column C are in service and the column A is in regeneration, brown sugar as mentioned above is fed onto the resin in column B, withdrawn beneath the resin in column B, fed onto the resin in column C, and withdrawn beneath the resin in column C to yield bottler's liquid sugar. Meanwhile, the resin in column A is regenerated, as described below.

As shown in FIG. 3*c*, wherein the column A and the column C are in service and the column B is in regeneration, brown sugar as mentioned above is fed onto the resin in column C, withdrawn beneath the resin in column C, fed onto the resin in column A, and withdrawn beneath the resin in column A to yield bottler's liquid sugar. Meanwhile, the resin in column B is regenerated, as described below.

As shown in FIG. 4*a* through FIG. 4*d*, a column D and a column E of conventional construction are filled to suitable levels with chloride form of Type-1 anion-exchange resin and interconnected in conventional manner, so as to be operable in a merry-go-round sequence as described below. As suggested by broken lines in FIG. 4*b* and FIG. 4*d*, either semi-continuous or intermittent operation may be achieved. Semi-continuous operation entails some deterioration in color as discussed below.

Figure 4A:
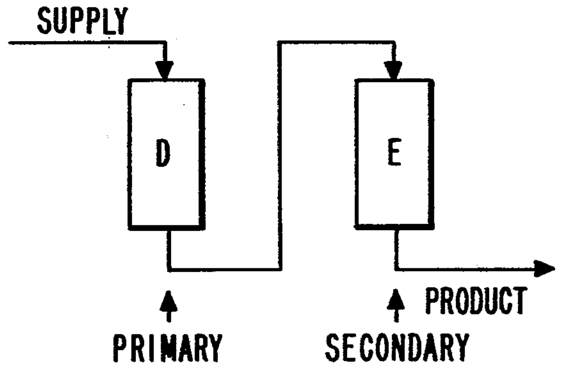
FIGS. 4*a* through 4*d* are sequential flow charts of service and regeneration in an array of two columns, in which the process of this invention alternatively may be practiced, in a merry-go-round sequence for either semi-continuous or intermittent operation. Countercurrent regeneration is shown.

As shown in FIG. 4*a*, wherein both columns are in service, brown sugar derived from cane sugar and crystallized from sugar liquors in intermediate strikes, is fed onto the resin in the column D, withdrawn beneath the resin in column D, fed onto the resin in the column E, and withdrawn beneath the resin in column E to yield bottler's liquid sugar.

Figure 4B:
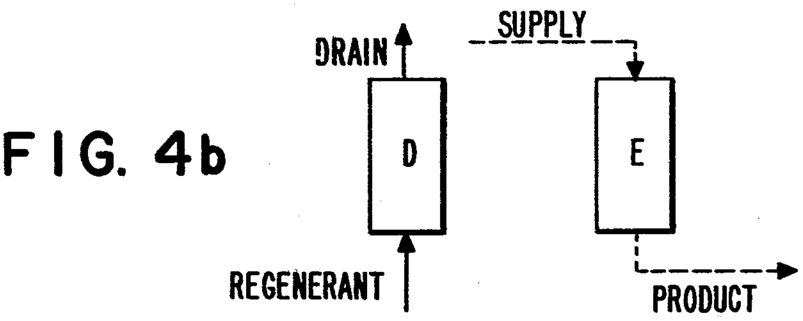

As shown in FIG. 4*b*, the resin in the column D is regenerated, as described below. Meanwhile, as indicated by broken lines, brown sugar as mentioned above may be fed onto the resin in the column E and withdrawn beneath the resin in the column E to yield bottler's liquid sugar for a semi-continuous operation. Preferably, flow in the column E is stopped, for intermittent operation.

Figure 4C:
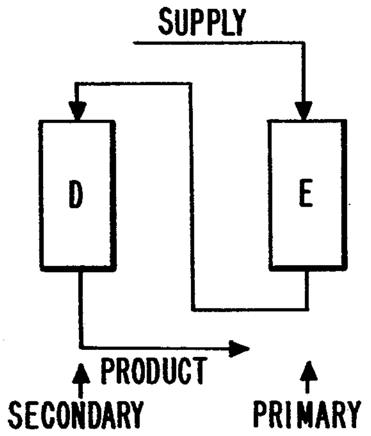

As shown in FIG. 4*c*, wherein both columns are in service, brown sugar as mentioned above is fed onto the resin in the column E, withdrawn beneath the resin in the column E, fed onto the resin in the column D, and withdrawn beneath the resin in the column D to yield bottler's liquid sugar.

Figure 4D:
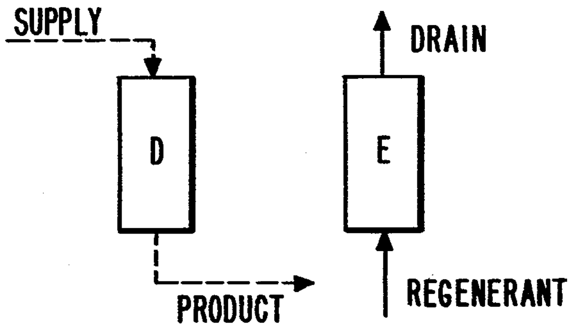

As shown in FIG. 4*d*, the resin in the column E is regenerated, as described below. Meanwhile, as indicated by broken lines, brown sugar as mentioned above may be fed onto the resin in the column D and withdrawn beneath the resin in column D to yield bottler's liquid sugar, for semi-continuous operation. Preferably, flow in the column D is stopped, for intermittent operation.

When one column is in regeneration and the other is in service, whereby semi-continuous operation is achieved in the array of FIG. 4*a* through FIG. 4*d*, some deterioration in color occurs. When both columns are in service, primary decolorization is achieved in the first column of the array, and secondary decolorization (polishing) is achieved in the second column of the array. If regeneration is accomplished rapidly, omission of secondary decolorization during regeneration of one column may be tolerated, particularly if sufficient amounts of bottler's liquid sugar having undergone both primary and secondary decolorization are blended with bottler's liquid sugar having undergone primary decolorization only.

Regeneration is accomplished essentially in sequential steps of sweetening-off, backwashing with water, passing a regenerant (or a sequence of regenerants) through the resin, twice-rinsing with water, and sweetening-on. Sweetening-off refers to displacement of the sugar in the column by water. The displaced sugar may be recycled. Sweetening-on refers to replacement of the sugar in the column to the concentration of the sugar in service. All sugar of lower concentration may be recycled. Twice-rinsing refers to a slow rinsing step, which is concurrent with respect to the regenerant, and a fast rinsing step, which is concurrent with respect to the product in service. These steps are conventional in operation of ion-exchange columns. Sweetening-on and sweetening-off are concurrent with respect to the sugar in service.

Regeneration is accomplished similarly both in the array of FIG. 3*a* through FIG. 3*c* and in the array of FIG. 4*a* through FIG. 4*d*. A regenerant (or a sequence of regenerants) is fed into the column, in which the resin is to be regenerated, countercurrently with respect to the sugar in service. Flow of the regenerant from a supply to a drain is indicated in FIGS. 3*a*, 3*b*, 3*c*, 4*b*, and 4*d*. Further information concerning countercurrent regeneration, as applicable here, may be found in U.S. Pat. No. 2,891,007 to P. H. Caskey et al.

The regenerant may be an aqueous solution of either sodium chloride or hydrochloric acid and also may contain sodium hypochlorite in the aqueous solution. If sodium chloride is used in the aqueous solution, sodium hydroxide, potassium hydroxide, ammonium hydroxide, or mixtures thereof, preferably sodium hydroxide, either may be used in the same solution or may be used in another aqueous solution passed before and concurrently with the aqueous solution of sodium chloride. The regenerant may be an aqueous solution both of sodium chloride and of sodium hydroxide, as specified on page 39 of *Duolite Ion Exchange Resins in the Treatment of Sugar Solutions*, op. cit.

It has been discovered that, if the resin is regenerated by an aqueous solution of hydrochloric acid followed by an aqueous solution of sodium chloride wherein the aqueous solution of sodium chloride also contains sodium hydroxide, potassium hydroxide, ammonium hydroxide, or mixtures thereof, preferably sodium hydroxide, and wherein the aqueous solution of hydrochloric acid also may contain sodium hypochlorite, the product advantageously may be passed in contact with the resin at a temperature of about 30° C.

Working examples of the process of this invention are set forth below. A primary column and a secondary column were used for each run, in an array as shown in FIG. 4*a*, wherein the column D represents the primary column and wherein column E represents the secondary column. Each column was filled with chloride form of Type-1 anion-exchange resin, Rohm & Haas IR-900 (20–50 U.S. Mesh) purchased from Rohm & Haas Company of Philadelphia, Pennsylvania. The resin in each column was cycled and prepared, in accordance with Guideline 173.25 of the U.S. Food and Drug Administration.

Bottler's liquid sugar produced from a mixture of 90% by dry weight of refined sugar from Mexican cane and 10% by dry weight of brown sugar from Mexican cane provided one color standard. Refined liquid sugar (100%) from Mexican cane provided another color standard. Brown sugar (100%) from Mexican cane provided another color standard. Color values were determined, in terms of Reference Basic Units and Color Indices, in accordance with procedures promulgated by the International Commission for Uniform Methods of Sugar Analysis, ICUMSA.

Brown sugar derived from Mexican cane and crystallized from sugar liquors in intermediate strikes, in aqueous solution filtered through diatomaceous earth, was fed onto the resin in the primary column, withdrawn beneath the resin in the primary column, fed onto the resin in the secondary column, and withdrawn beneath the resin in the secondary column to yield bottler's liquid sugar. Color values were determined, in small samples taken from the product as withdrawn beneath the resin in the primary column and in small samples taken from the product as withdrawn beneath the resin in the secondary column, at successive arbitrary points in the runs, as indicated in the tables below.

Except as noted below, the primary column used for each run was regenerated concurrently with respect to the product in service, in contradistinction with FIGS. 4*a* through 4*d* wherein countercurrent regeneration is shown, whereupon the regenerated column was used as the secondary column for the next run and the other column was used as the primary column for the next run. Service was stopped during regeneration.

Regeneration was accomplished in sequential steps of sweetening-off, backwashing with water, passing a regenerant (or a sequence of regenerants) through the resin, twice-rinsing with water, and sweetening-on, as described above and as specified in Table III below.

Tables I(A) through I(D) represent a first series of runs wherein the product was passed through the columns at 60° C. Table I(A) represents a first run, wherein each column had been cycled and prepared in accordance with Guideline 173.25 of the U.S. Food and Drug Administration. Table I(B) represents a second run, wherein the primary column from the first run had been regenerated by concurrent regeneration employing Regenerant "A" (Table III) and was used as the secondary column for the second run, and wherein the secondary column from the first run was used as the primary column for the second run. Table I(C) represents a third run, wherein the primary column from the second run was regenerated by concurrent regeneration employing Regenerant "C" (Table III) followed by Regenerant "A" (Table III) and was used as the secondary column for the third run, and wherein the secondary column from the second run was used as the primary column for the third run. Table I(D) represents a fourth run, wherein the primary column from the third run had been regenerated by concurrent regeneration employing Regenerant "B" (Table III) followed by Regenerant "A" (Table III) and was used as the secondary column for the fourth run, and wherein the secondary column from the third run was used as the primary column for the fourth run.

Tables II(A) through II(E) represent a second series of runs wherein the product was passed through the columns at 30° C. Table II(A) represents a first run, wherein each column was cycled and prepared, in accordance with Guideline 173.25 of the U.S. Food and Drug Administration. In the second series, no run comparable to the run represented by Table I(B) of the first series was attempted, for reasons explained below. Table II(B) represents a second run, wherein the primary column from the first run had been regenerated by concurrent regeneration employing Regenerant "C" (Table III) followed by Regenerant "A" (Table III) and was used as the secondary column for the second run, and wherein the secondary column from the first run was used as the primary column for the second run. Table II(C) represents a third run, wherein the primary column from the second run had been regenerated by concurrent regeneration employing Regenerant "B" (Table III) followed by Regenerant "A" (Table III) and was used as the secondary column for the third run, and wherein the secondary column from the second run was used as the primary column for the third run. Table II(D) represents a fourth run, wherein the primary column from the third run had been regenerated by concurrent regeneration employing Regenerant "B" (Table III) and was used as the secondary column for the fourth run, and wherein the secondary column from the third run was used as the primary column for the fourth run. Table II(E) represents a fifth run, wherein each column had been regenerated by concurrent regeneration employing Regenerant "B" (Table III) followed by Regenerant "A" (Table III), wherein the primary column from the fourth run was used as the secondary column for the fifth run, and wherein the secondary column from the fourth run was used as the primary column for the fifth run.

Table III sets forth the parameters for regeneration as carried out for each run represented by Tables I(A) through I(D) and by Tables II(A) through II(E). Regenerants "A", "B", and "C" are specified on Table III. In Regenerant "C", sodium hypochlorite serves as a bacteriacide.

Table IV sets forth typical color values, for reference, both in terms of Reference Basic Units (RBU's) and in terms of Color Indices (CI's) in accordance with procedures promulgated by ICUMSA. Formulae for calculation of RBU's and Color Indices are indicated on Table IV. Methodology is well known by those skilled in the art.

TABLE I(A)

| PRIMARY DECOLORIZER | | | SECONDARY DECOLORIZER | | |
|---|---|---|---|---|---|
| Throughput | RBU | CI | Throughput | RBU | CI |
| 2.4 liters | 26.1 | 0.031 | 2.0 liters | 26.1 | 0.030 |
| 4.8 liters | 40.4 | 0.051 | 4.0 liters | 24.8 | 0.025 |
| 6.8 liters | 33.2 | 0.033 | 6.0 liters | 25.0 | 0.029 |
| 9.0 liters | 35.9 | 0.039 | 8.0 liters | 25.0 | 0.032 |
| 11.2 liters | 36.2 | 0.041 | 10.0 liters | 25.8 | 0.042 |
| 13.4 liters | 50.0 | 0.050 | 12.0 liters | 28.1 | 0.028 |
| 15.6 liters | 56.2 | 0.056 | 18.0 liters | 30.1 | 0.039 |
| 20.0 liters | 48.5 | 0.055 | 24.0 liters | 30.2 | 0.037 |
| 26.6 liters | 62.8 | 0.072 | 28.0 liters | 30.7 | 0.039 |
| 31.2 liters | 60.4 | 0.068 | | | |

Service Flow Rate = 0.035 liters/min.
Feed Concentration = 58° Brix.

TABLE I(B)

| PRIMARY DECOLORIZER | | | SECONDARY DECOLORIZER | | |
|---|---|---|---|---|---|
| Throughput | RBU | CI | Throughput | RBU | CI |
| 6.0 liters | 34.5 | 0.043 | 5.0 liters | 33.8 | 0.042 |
| 8.2 liters | 33.3 | 0.041 | 7.0 liters | 38.6 | 0.039 |
| 17.0 liters | 38.1 | 0.044 | 14.0 liters | 31.4 | 0.035 |
| 24.0 liters | 32.1 | 0.032 | 20.0 liters | 18.6 | 0.019 |
| 28.4 liters | 28.2 | 0.033 | 24.0 liters | 21.1 | 0.024 |
| 30.6 liters | 31.3 | 0.034 | 26.0 liters | 21.1 | 0.023 |
| 32.8 liters | 29.7 | 0.030 | 28.0 liters | 20.7 | 0.021 |
| 35.0 liters | 31.9 | 0.032 | 30.0 liters | 21.9 | 0.025 |

Service Flow Rate = 0.035 liters/min.
Feed Concentration = 58° Brix.

TABLE I(C)

| PRIMARY DECOLORIZER | | | SECONDARY DECOLORIZER | | |
|---|---|---|---|---|---|
| Throughput | RBU | CI | Throughput | RBU | CI |
| 2.7 liters | 15.9 | 0.016 | 2.0 liters | 24.8 | 0.031 |
| 9.1 liters | 24.6 | 0.028 | 8.0 liters | 18.7 | 0.024 |
| 13.5 liters | 35.8 | 0.036 | 12.0 liters | 34.6 | 0.038 |
| 20.1 liters | 42.1 | 0.042 | 18.0 liters | 30.4 | 0.030 |
| 22.3 liters | 46.9 | 0.051 | 20.0 liters | 20.0 | 0.020 |
| 26.7 liters | 40.6 | 0.041 | 24.0 liters | 27.7 | 0.031 |
| 28.9 liters | 44.8 | 0.045 | 26.0 liters | 28.9 | 0.031 |
| 31.1 liters | 41.9 | 0.043 | 28.0 liters | 26.6 | 0.030 |
| 33.3 liters | 40.5 | 0.053 | 30.0 liters | 28.9 | 0.029 |
| 35.5 liters | 57.5 | 0.062 | 32.0 liters | 25.7 | 0.030 |

Service Flow Rate = 0.025 liters/min.
Feed Concentration = 57° Brix.

TABLE I(D)

| PRIMARY DECOLORIZER | | | SECONDARY DECOLORIZER | | |
|---|---|---|---|---|---|
| Throughput | RBU | CI | Throughput | RBU | CI |
| 2.6 liters | 20.0 | 0.020 | 2.0 liters | 18.4 | 0.021 |
| 4.8 liters | 18.4 | 0.018 | 4.0 liters | 33.0 | 0.033 |
| 11.4 liters | 16.5 | 0.022 | 10.0 liters | 18.6 | 0.019 |
| 13.6 liters | 22.4 | 0.029 | 12.0 liters | 19.9 | 0.029 |
| 18.0 liters | 32.2 | 0.037 | 16.0 liters | 26.3 | 0.034 |
| 22.4 liters | 30.7 | 0.031 | 20.0 liters | 26.2 | 0.026 |
| 26.8 liters | 29.8 | 0.032 | 24.0 liters | 21.2 | 0.025 |
| 31.2 liters | 35.5 | 0.036 | 28.0 liters | 25.2 | 0.026 |
| 33.6 liters | 30.8 | 0.031 | 30.0 liters | 38.8 | 0.044 |
| 35.8 liters | 41.8 | 0.048 | 32.0 liters | 18.1 | 0.018 |

Service Flow Rate = 0.025 liters/min.
Feed Concentration = 52.6° Brix.

TABLE II(A)

| PRIMARY DECOLORIZER | | | SECONDARY DECOLORIZER | | |
|---|---|---|---|---|---|
| Throughput | RBU | CI | Throughput | RBU | CI |
| 4.6 liters | 38.3 | 0.038 | 4.0 liters | 21.3 | 0.021 |
| 11.2 liters | 65.2 | 0.076 | 10.0 liters | 21.0 | 0.045 |
| 15.6 liters | 63.6 | 0.077 | 14.0 liters | 30.3 | 0.039 |
| 20.0 liters | 72.1 | 0.080 | 18.0 liters | 34.7 | 0.039 |
| 24.4 liters | 98.9 | 0.112 | 22.0 liters | 33.5 | 0.040 |
| 26.6 liters | 96.5 | 0.106 | 24.0 liters | 41.4 | 0.044 |
| 29.5 liters | 101.4 | 0.122 | 26.7 liters | 30.1 | 0.030 |

Service Flow Rate = 0.025 liters/min.
Feed Concentration = 58° Brix.

TABLE II(B)

| PRIMARY DECOLORIZER | | | SECONDARY DECOLORIZER | | |
|---|---|---|---|---|---|
| Throughput | RBU | CI | Throughput | RBU | CI |
| 4.6 liters | 29.3 | 0.040 | 4.0 liters | 22.1 | 0.022 |
| 9.0 liters | 38.1 | 0.044 | 8.0 liters | 20.3 | 0.025 |
| 13.4 liters | 48.5 | 0.054 | 12.0 liters | 19.1 | 0.019 |
| 17.8 liters | 51.2 | 0.064 | 16.0 liters | 21.7 | 0.022 |
| 22.4 liters | 59.6 | 0.069 | 20.0 liters | 16.3 | 0.024 |

TABLE II(B)-continued

| PRIMARY DECOLORIZER | | | SECONDARY DECOLORIZER | | |
|---|---|---|---|---|---|
| Throughput | RBU | CI | Throughput | RBU | CI |
| 26.6 liters | 57.0 | 0.078 | 24.0 liters | 22.1 | 0.022 |
| 28.8 liters | 62.2 | 0.074 | 26.0 liters | 22.9 | 0.023 |
| 31.0 liters | 78.4 | 0.081 | 28.0 liters | 24.6 | 0.025 |

Service Flow Rate = 0.025 liters/min.
Feed Concentration = 57° Brix.

TABLE II(C)

| PRIMARY DECOLORIZER | | | SECONDARY DECOLORIZER | | |
|---|---|---|---|---|---|
| Throughput | RBU | CI | Throughput | RBU | CI |
| 4.6 liters | 44.1 | 0.051 | 4.0 liters | 24.6 | 0.025 |
| 9.0 liters | 37.8 | 0.046 | 8.0 liters | 25.5 | 0.026 |
| 13.4 liters | 44.6 | 0.050 | 12.0 liters | 27.2 | 0.031 |
| 17.8 liters | 54.9 | 0.060 | 16.0 liters | 29.3 | 0.031 |
| 22.2 liters | 57.2 | 0.071 | 20.0 liters | 30.0 | 0.030 |
| 26.4 liters | 58.4 | 0.069 | 24.0 liters | 17.9 | 0.022 |
| 30.6 liters | 72.1 | 0.080 | 28.0 liters | 21.6 | 0.022 |
| 32.8 liters | 65.6 | 0.081 | 30.0 liters | 21.0 | 0.021 |

Service Flow Rate = 0.025 liters/min.
Feed Concentration = 52.6° Brix.

TABLE II(D)

| PRIMARY DECOLORIZER | | | SECONDARY DECOLORIZER | | |
|---|---|---|---|---|---|
| Throughout | RBU | CI | Throughput | RBU | CI |
| 4.5 liters | 36.0 | 0.036 | 4.0 liters | 16.1 | 0.016 |
| 8.9 liters | 39.7 | 0.048 | 8.0 liters | 26.5 | 0.033 |
| 13.3 liters | 49.4 | 0.055 | 12.0 liters | 31.9 | 0.034 |
| 17.7 liters | 48.9 | 0.056 | 16.0 liters | 31.9 | 0.032 |
| 22.1 liters | 52.2 | 0.064 | 20.0 liters | 31.9 | 0.037 |
| 26.5 liters | 61.3 | 0.067 | 24.0 liters | 33.9 | 0.037 |
| 28.7 liters | 59.0 | 0.071 | 26.0 liters | 33.9 | 0.036 |
| 30.9 liters | 60.6 | 0.068 | 28.0 liters | 28.2 | 0.035 |
| 33.1 liters | 65.1 | 0.086 | 30.0 liters | 34.2 | 0.037 |

Service Flow Rate = 0.025 liters/min.
Feed Concentration = 52.6° Brix.

TABLE II(E)

| PRIMARY DECOLORIZER | | | SECONDARY DECOLORIZER | | |
|---|---|---|---|---|---|
| Throughput | RBU | CI | Throughput | RBU | CI |
| 31.2 liters | 47.5 | 0.0475 | 28.0 liters | 22.2 | 0.0222 |

Service Flow Rate = 0.025 liters/min.
Feed Concentration = 52.6° Brix.

TABLE III

| PARAMETERS FOR REGENERATION | |
|---|---|
| Sweeten-off Water | |
| Volume | 1600 liters/$m^3$ resin |
| Flow Rate | 47–67 liters/min./$m^3$ resin |
| Backwash | |
| Volume | 1470 liters/$m^3$ resin |
| Flow Rate | 142 liters/min./$m^2$ cross-sectional area |
| Regenerant "A" | |
| Type | NaCl and NaOH, in aqueous solution |
| Volume | |
| NaCl | 160 kg/$m^3$ resin |
| NaOH | 16 kg/$m^3$ resin |
| Concentration | |
| NaCL | 10% by weight |
| NaOH | 1% by weight |
| Flow Rate | 50 liters/min./$m^3$ resin |
| Regenerant "B" | |
| Type | HC1, in aqueous solution |
| Volume | 23 kg/$m^3$ resin |
| Concentration | 3.5% by weight |
| Flow Rate | 21.7 liters/min./$m^3$ resin |
| Regenerant "C" | |
| Type | HCl and NaOCl, in aqueous solution |

TABLE III-continued

| PARAMETERS FOR REGENERATION | |
|---|---|
| Volume | |
| HCl | 23 kg/$m^3$ resin |
| NaOCL | 6.5 gm/$m^3$ resin |
| Concentration | |
| HCl | 3.5% by weight |
| NaOCl | 0.001% by weight |
| Flow rate | 21.7 liters/min./$m^3$ resin |
| Slow Rinse | |
| Volume | 1000 liters/$m^3$ resin |
| Flow rate | 50 liters/min./$m^3$ resin |
| Fast Rinse | |
| Volume | 3200 liters/$m^3$ resin |
| Flow Rate | 134 liters/min./$m^3$ resin |
| Sweeten-on Sugar | |
| Volume | 1270 liters/$m^3$ resin |
| Flow Rate | 47–67 liters/min./$m^3$ resin |
| Temperature | Ambient |

TABLE IV

| TYPICAL COLOR VALUES | | |
|---|---|---|
| SUGAR | RBU | CI |
| Mexican Refined | 84 | 0.0845 |
| Mexican Brown | 384 | 0.4373 |
| Blend: 90% Mexican Refined<br>10% Mexican Brown | 109 | 0.1186 |

$$RBU = 1000 \times \frac{\text{abs. 420 nm} - 2(\text{abs. 720 nm})}{b \times c}$$

$$CI = \frac{-\log(\%T \text{ at } 420 \text{ nm})}{b \times c}$$

RBU = Reference Basic Unit
CI = Color Index
nm = nanometer
b = cell length in cm
c = concentration in gms/ml
%T = percent transmittance
abs. = absorbance In the first series of runs, wherein the product was passed through the columns at 60° C., bottler's liquid sugar of excellent color was produced in each run, regardless of the regenerants that were used between runs. Bottler's liquid sugar, as thus produced, was superior in color value to each referenced value on Table IV. Refined sugars having color values lower than 35 RBU's, or 0.0358 Color Index, are considered premium sugars.

In the second series of runs, wherein the product was passed through the columns at 30° C., difficulties were anticipated after the first run, wherein it appeared that decolorization in the primary column was inadequate, although bottler's liquid sugar of satisfactory color was withdrawn from the secondary column. After the first run, concurrent regeneration employing a sequence of regenerants was attempted, whereupon it was demonstrated that, if the resin is regenerated by an aqueous solution of hydrochloric acid followed by an aqueous solution of sodium chloride wherein the aqueous solution of sodium chloride also contains sodium hydroxide and wherein the aqueous solution of hydrochloric acid also may contain sodium hypochlorite, decolorization in the primary column is adequate. Thus, service at 30° C. became possible, as indicated by the second and third runs of the second series.

In the second series of runs, a fourth run wherein the secondary column therefor had been regenerated differently, the product withdrawn from the secondary column appeared to deteriorate in color value. Also in, a fifth run wherein both columns had been regenerated by the sequence of regenerants discussed above, the product withdrawn from each column improved in color value.

It is advantageous to run the product in service at a low temperature, as exemplified by about 30° C., rather than at a high temperature, as exemplified by about 60° C., so as to require less heating and cooling energy. Bottler's liquid sugar is expected to be used, as by soft-drink bottlers, at low temperatures.

We claim:

1. A process for production of bottler's liquid sugar essentially from brown sugar derived from cane sugar and crystallized in one or more intermediate strikes from sugar liquors comprising the steps of (a) remelting the crystallized product of one or more intermediate strikes, (b) filtering the remelted product, and (c) passing the filtered product in contact with chloride form of Type-1 strong-base anion-exchange resin.

2. The process of claim 1 wherein the filtered product is passed serially through plural beds of similar resin.

3. The process of claim 2 wherein the beds are interchanged in a merry-go-round sequence for purposes of regeneration.

4. The process of claim 1, 2 or 3 wherein the resin is regenerated by a regenerant passed countercurrently with respect to the filtered product in service.

5. The process of claim 4 wherein the regenerant is an aqueous solution of sodium chloride.

6. The process of claim 5 wherein the aqueous solution also contains a member selected from the group consisting of sodium hydroxide, potassium hydroxide, ammonium hydroxide, and mixtures thereof.

7. The process of claim 5 wherein the aqueous solution of sodium chloride is preceded by an aqueous solution of a member selected from the group consisting of sodium hydroxide, potassium hydroxide, ammonium hydroxide, and mixtures thereof, the latter solution passing concurrently with the aqueous solution of sodium chloride.

8. The process of claim 5 wherein the aqueous solution of sodium chloride is preceded by an aqueous solution of hydrochloric acid passing concurrently with the aqueous solution of sodium chloride.

9. The process of claim 8 wherein the aqueous solution of hydrochloric acid also contains sodium hypochlorite.

10. The process of claim 4 wherein the regenerant is an aqueous solution of hydrochloric acid.

11. The process of claim 10 wherein the aqueous solution also contains sodium hypochlorite.

12. The process of claim 1, 2 or 3 wherein said steps are carried out at about 30° C.

13. The process of claim 12 wherein the resin is regenerated by an aqueous solution of hydrochloric acid followed by an aqueous solution of sodium chloride wherein the aqueous solution of sodium chloride also contains a member selected from the group consisting of sodium hydroxide, potassium hydroxide, ammonium hydroxide, and mixtures thereof.

14. The process of claim 13 wherein the aqueous solution of hydrochloric acid also contains sodium hypochlorite.

15. The process of claim 13 wherein the member is sodium hydroxide.

16. The process of claim 15 wherein the aqueous solution of hydrochloric acid also contains sodium hypochlorite.

17. In a process for decolorization of sugar solutions by contact with chloride form of Type-1 strong-base anion-exchange resin, an improvement wherein decolorization is carried out at about 30° C., wherein the resin is regenerated by an aqueous solution of hydrochloric acid followed by an aqueous solution of sodium chloride, and wherein the aqueous solution of sodium chloride also contains a member selected from the group consisting of sodium hydroxide, potassium hydroxide, ammonium hydroxide, and mixtures thereof.

18. The process of claim 17 wherein the aqueous solution of hydrochloric acid also contains sodium hypochlorite.

19. The process of claim 17 or 18 wherein the member is sodium hydroxide.

20. The process of claim 19 wherein the regeneration is carried out at ambient temperature.

* * * * *

UNITED STATES PATENT OFFICE
CERTIFICATE OF CORRECTION

PATENT NO. : 4,193,817

DATED : March 18, 1980

INVENTOR(S) : Terry R. Dillman and Dennis J. Burke

It is certified that error appears in the above-identified patent and that said Letters Patent are hereby corrected as shown below:

On the title page, the assignee should be identified as:

Illinois Water Treatment Company,
Rockford, Ill.

In column 7, in line 43, "bacteriacide" should read --bactericide--.

In column 9, in the left-hand column of Table III, "NaCL" should read --NaCl--.

Signed and Sealed this

*Tenth* Day of *November 1981*

[SEAL]

*Attest:*

GERALD J. MOSSINGHOFF

*Attesting Officer* *Commissioner of Patents and Trademarks*